US009059822B2

(12) United States Patent
Frenne et al.

(10) Patent No.: US 9,059,822 B2
(45) Date of Patent: Jun. 16, 2015

(54) RADIO NETWORK NODE, USER EQUIPMENT AND METHODS THEREIN

(75) Inventors: Mattias Frenne, Uppsala (SE); Robert Baldemair, Solna (SE); Dirk Gerstenberger, Stockholm (SE); Daniel Larsson, Solna (SE); Jung-Fu Cheng, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 160 days.

(21) Appl. No.: 13/513,714

(22) PCT Filed: Apr. 5, 2012

(86) PCT No.: PCT/SE2012/050380
§ 371 (c)(1),
(2), (4) Date: Jun. 4, 2012

(87) PCT Pub. No.: WO2013/025145
PCT Pub. Date: Feb. 21, 2013

(65) Prior Publication Data
US 2013/0265944 A1 Oct. 10, 2013

Related U.S. Application Data

(60) Provisional application No. 61/522,702, filed on Aug. 12, 2011.

(51) Int. Cl.
H04W 72/04 (2009.01)
H04L 1/00 (2006.01)
H04L 1/18 (2006.01)

(52) U.S. Cl.
CPC ............ *H04L 1/0031* (2013.01); *H04W 72/042* (2013.01); *H04L 1/0003* (2013.01); *H04L 1/0009* (2013.01); *H04L 1/1896* (2013.01)

(58) Field of Classification Search
CPC ........................... H04L 1/0009; H04W 72/042
USPC .......... 370/204, 330, 329, 394, 331; 455/507, 455/509, 450
See application file for complete search history.

(56) References Cited

U.S. PATENT DOCUMENTS 7,808,999 B2 * 10/2010 Chen et al. ..................... 370/394
8,284,732 B2 * 10/2012 Nimbalker et al. ............ 370/330
(Continued)

FOREIGN PATENT DOCUMENTS

WO    WO201012331    * 10/2010    .............. H04J 11/00

OTHER PUBLICATIONS

International Search Report issued in PCT/SE2012/050380 dated Aug. 31, 2012.
(Continued)

*Primary Examiner* — Khaled Kassim
*Assistant Examiner* — Parth Patel
(74) *Attorney, Agent, or Firm* — Baker Botts, LLP

(57) ABSTRACT

Embodiments herein disclose a method in a user equipment (10) for communicating with a radio network node (12, 12') in a radio communications network, which user equipment (10) is served by the radio network node (12, 12'). The user equipment receives first information from the radio network node (12, 12') over a control channel, which first information comprises a pointer to which scheduling assignment element for the user equipment (10) to use. The scheduling assignment element is comprised in a set of scheduling assignments stored at the user equipment (10). The user equipment communicates data with the radio network node (12, 12') using second information in the scheduling assignment element indicated by the pointer.

26 Claims, 11 Drawing Sheets

(56) References Cited

U.S. PATENT DOCUMENTS

| | | | |
|---|---|---|---|
| 8,428,606 B1* | 4/2013 | Vrzic et al. | 455/450 |
| 2004/0022177 A1* | 2/2004 | Awad et al. | 370/204 |
| 2008/0084844 A1* | 4/2008 | Reznik et al. | 370/330 |
| 2008/0205648 A1* | 8/2008 | Hanov et al. | 380/270 |
| 2008/0225783 A1* | 9/2008 | Wang et al. | 370/329 |
| 2009/0249153 A1* | 10/2009 | Zhang | 714/748 |
| 2009/0257385 A1* | 10/2009 | Meylan et al. | 370/329 |
| 2009/0285163 A1* | 11/2009 | Zhang et al. | 370/329 |
| 2009/0316814 A1* | 12/2009 | Seo et al. | 375/260 |
| 2010/0040001 A1* | 2/2010 | Montojo et al. | 370/329 |
| 2010/0173659 A1* | 7/2010 | Shin et al. | 455/500 |
| 2010/0220674 A1* | 9/2010 | Fu | 370/329 |
| 2010/0309877 A1* | 12/2010 | Damnjanovic et al. | 370/331 |
| 2011/0093755 A1* | 4/2011 | Gao | 714/748 |
| 2011/0103509 A1* | 5/2011 | Chen et al. | 375/295 |
| 2011/0164582 A1* | 7/2011 | Seo et al. | 370/329 |
| 2011/0228732 A1* | 9/2011 | Luo et al. | 370/329 |
| 2011/0230219 A1* | 9/2011 | Shores et al. | 455/507 |
| 2011/0268045 A1* | 11/2011 | Heo et al. | 370/329 |
| 2011/0274077 A1* | 11/2011 | Yamada et al. | 370/329 |
| 2012/0009963 A1* | 1/2012 | Kim et al. | 455/509 |
| 2012/0044921 A1* | 2/2012 | Chung et al. | 370/338 |
| 2012/0269140 A1* | 10/2012 | Nam et al. | 370/329 |
| 2012/0327883 A1* | 12/2012 | Yang et al. | 370/329 |
| 2013/0016655 A1* | 1/2013 | Heo et al. | 370/328 |
| 2013/0058317 A1* | 3/2013 | Park et al. | 370/336 |
| 2013/0114570 A1* | 5/2013 | Park et al. | 370/335 |

OTHER PUBLICATIONS

Written Opinion issued in PCT/SE2012/050380 dated Aug. 31, 2012.
ETSI TS 136 213 V10.0.1, "LTE; Evolved Universal Terrestrial Radio Access (E-UTRA); Physical Layer Procedures (3GPP TS 36.213 Version 10.01.1 Release 10)," Section 9.1.1, Jan. 2011.

* cited by examiner

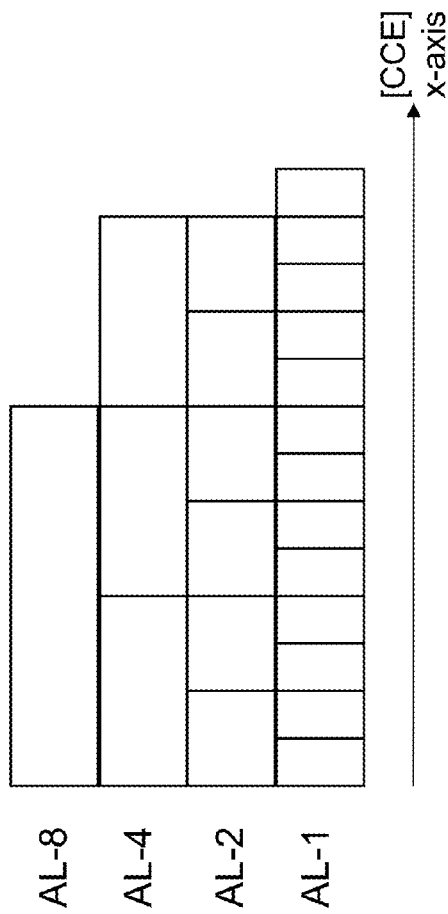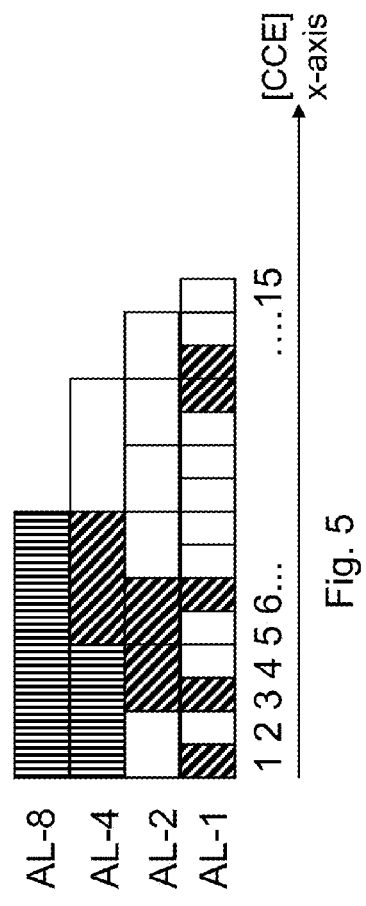

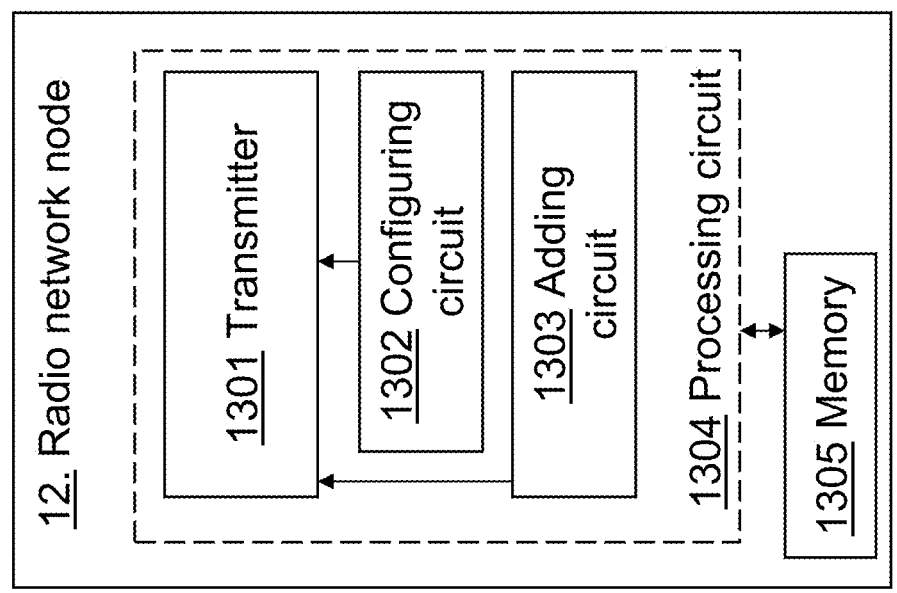
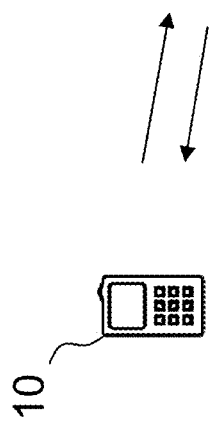
Fig. 13

US 9,059,822 B2

RADIO NETWORK NODE, USER EQUIPMENT AND METHODS THEREIN

This application is the U.S. national phase of International Application No. PCT/SE2012/050380 filed 5 Apr. 2012 which designated the U.S. and claims priority to U.S. Provisional Application No. 61/522,702 filed 12 Aug. 2011, the entire contents of each of which are hereby incorporated by reference.

TECHNICAL FIELD

Embodiments herein relate to a radio network node, a user equipment and methods therein. In particular, embodiments herein relate to communication between the radio network node and the user equipment in a radio communications network.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for radio communication. A radio communications network comprises radio base stations providing radio coverage over at least one respective geographical area forming a cell. The cell definition may also incorporate frequency bands used for transmissions, which means that two different cells may cover the same geographical area but using different frequency bands. User equipments (UE), also referred to herein as terminals, are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

Long Term Evolution (LTE) is a project within the 3rd Generation Partnership Project (3GPP) to evolve the WCDMA standard towards the fourth generation (4G) of mobile telecommunication networks. In comparisons with third generation (3G) WCDMA, LTE provides increased capacity, much higher data peak rates and significantly improved latency numbers. For example, the LTE specifications support downlink data peak rates up to 300 Mbps, uplink data peak rates of up to 75 Mbit/s and radio access network round-trip times of less than 10 ms. In addition, LTE supports scalable carrier bandwidths from 20 MHz down to 1.4 MHz and supports both Frequency Division Duplex (FDD) and Time Division Duplex (TDD) operation.

LTE is a Frequency Division Multiplexing technology wherein Orthogonal Frequency Division Multiplexing (OFDM) is used in a DL transmission from a radio base station to a user equipment. Single Carrier—Frequency Domain Multiple Access (SC-FDMA) is used in an UL transmission from the user equipment to the radio base station. Services in LTE are supported in the packet switched domain. The SC-FDMA used in the UL is also referred to as Discrete Fourier Transform Spread (DFTS)-OFDM.

A basic LTE downlink physical resource may thus be seen as a time-frequency grid as illustrated in FIG. 1, where each Resource Element (RE) corresponds to one OFDM subcarrier during one OFDM symbol interval. A symbol interval comprises a cyclic prefix (cp), which cp is a prefixing of a symbol with a repetition of the end of the symbol to act as a guard band between symbols and/or facilitate frequency domain processing. Frequencies f or subcarriers having a subcarrier spacing $\Delta f$ are defined along an z-axis and symbols are defined along an x-axis.

In a time domain, LTE downlink transmissions are organized into radio frames of 10 ms, $T_{frame}=10$ ms, wherein each radio frame comprises ten equally-sized subframes, #0-#9, each with a Tsubframe=1 ms of length in time as shown in FIG. 2. Furthermore, the resource allocation in LTE is typically described in terms of resource blocks, where a resource block corresponds to one slot of 0.5 ms in the time domain and 12 contiguous subcarriers in the frequency domain. The resource blocks are numbered in the frequency domain, starting with resource block 0 from one end of the system bandwidth.

Downlink and uplink transmissions are dynamically scheduled, i.e. in each subframe the radio base station transmits control information about to or from which user equipments data is transmitted and upon which resource blocks the data is transmitted. The control information for a given user equipment is transmitted using one or multiple Physical Downlink Control Channels (PDCCH). Control information of a PDCCH is transmitted in the control region comprising the first n=1, 2, 3 or 4 OFDM symbols in each subframe where n is the Control Format Indicator (CFI). Typically the control region may comprise many PDCCH carrying control information to multiple user equipments simultaneously. A downlink system with 3 OFDM symbols allocated for control signaling, for example the PDCCH, is illustrated in FIG. 3 and denoted as potential control region. However, the figure shows an example where one symbol out of the 3 possible is used for control signalling. The resource elements used for control signaling are indicated with wave-formed lines and resource elements used for reference symbols are indicated with diagonal lines. Frequencies f or subcarriers are defined along an z-axis and symbols are defined along an x-axis. After channel coding, scrambling, modulation and interleaving of the control information the modulated symbols are mapped to the resource elements in the control region. To multiplex multiple PDCCH onto the control region, Control Channel Elements (CCE) has been defined, where each CCE maps to 36 resource elements. One PDCCH may, depending on the information payload size and the required level of channel coding protection, comprise 1, 2, 4 or 8 CCEs, and the number is denoted as the CCE Aggregation Level (AL). By choosing the aggregation level, link-adaptation of the PDCCH may be obtained. In total there are a number, $N_{CCE}$, of CCEs available for all the PDCCH to be transmitted in the subframe and the number $N_{CCE}$ varies from subframe to subframe depending on the number of control symbols n.

As $N_{CCE}$ varies from subframe to subframe, the user equipment needs to blindly determine the position and the number of CCEs used for its PDCCH which can be a computationally intensive decoding task. Therefore, some restrictions in the number of possible blind decodings the user equipment needs to go through have been introduced in systems today. For instance, the CCEs are numbered and CCE aggregation levels of size K can only start on CCE numbers evenly divisible by K, see FIG. 4. E.g. AL 4 can only start on CCE number 0, 4, etc.

The set of CCEs where the user equipment needs to blindly decode and search for a valid PDCCH are called search spaces. This is the set of CCEs on an AL the user equipment should monitor for scheduling assignments or other control information, see example in FIG. 5. In each subframe and on each AL, the user equipment attempts to decode all the PDCCHs that can be formed from the CCEs in its search space. If the Cyclic Redundancy Check (CRC) value checks out, then the content, i.e. the control information, of the PDCCH is assumed to be valid for the user equipment and the user equipment further processes the received information. Two or more user equipment will often have overlapping search spaces and the network has to select one of them for scheduling of the control channel. When this happens, the non-scheduled user equipment is said to be blocked. The search spaces vary pseudo-randomly from subframe to subframe to minimize this blocking probability. FIG. 5 is an exemplifying sketch showing the search space, diagonal striped, a certain user equipment needs to monitor. In total there are $N_{CCE}=15$ CCEs in this example and the common search space is marked with vertical stripes.

A search space is divided to a common part and a user equipment specific part. In the common search space, the PDCCH comprising information to all or a group of user equipments is transmitted, paging, system information etc. If carrier aggregation is used, a user equipment will find the common search space present on the primary component carrier (PCC) only. The common search space is restricted to aggregation levels 4 and 8 to give sufficient channel code protection for all user equipments in the cell, since it is a broadcast channel, link adaptation cannot be used. The search spaces of the different aggregation level, $m_8$ and $m_4$, of first PDCCH, with lowest CCE number, in an AL of 8 or 4 respectively belongs to the common search space as described in TS 36.213, v.10.0.1 section 9.1.1. For efficient use of the CCEs in the system, the remaining search space is user equipment specific at each aggregation level.

A CCE comprises 36 Quadrature Phase-Shift Keying (QPSK) modulated symbols that map to the 36 RE unique for this CCE. To maximize the diversity and interference randomization, interleaving of all the CCEs is used before a cell specific cyclic shift and mapping to REs, see the processing steps in FIG. 6. Note that in most cases some CCEs are empty due to the PDCCH location restriction to user equipment search spaces and aggregation levels. The empty CCEs are included in the interleaving process and mapping to RE as any other PDCCH to maintain the search space structure. Empty CCE are set to zero power and this power may instead be used by non-empty CCEs to further enhance the PDCCH transmission. The PDCCH is structured into CCE 601 and then scrambled and modulated 602. The process continues by layer mapping the signals 603 and transmits the signals in a diversified manner.

Furthermore, to enable the use of 4 antenna TX diversity, a group of 4 adjacent QPSK symbols in a CCE is mapped to 4 RE, denoted a RE group (REG). Hence, in 604, the CCE interleaving is quadruplex, group of 4, based, followed by a cyclic shift 605 that is based on Cell ID, and mapping process 606 has a granularity of 1 REG and one CCE corresponds to 9 REGs (=36 RE).

There will also in general be a collection of REG that remains as leftovers after the set of size $N_{CCE}$ CCEs has been determined (although the leftover REGs are always fewer than 36 RE) since the number of REGs available for PDCCH in the system bandwidth is in general not an even multiple of 9 REGs. These leftover REGs are in LTE unused by the system.

The information carried on the PDCCH is called Downlink Control Information (DCI). Depending on the configured transmission mode, e.g. if a user equipment is configured in one uplink and one downlink transmission mode, and the purpose of the message, the content of the DCI varies. As an example an uplink Multiple Input Multiple Output (MIMO) transmission is scheduled using DCI format 4 and comprises the necessary information about where the user equipment shall transmit the uplink data, i.e. the resource block assignment, which precoding matrix to use, which reference signal to use etc. The corresponding downlink DCI format is format 2C. The size of each DCI format depends on the system bandwidth and reaches in these examples 66 bits for DCI format 2C.

With the introduction of cross carrier scheduling in current systems, wherein the PDCCH transmitted on one carrier is used to schedule a Physical Downlink Shared Channel (PDSCH) or Physical Uplink Shared Channel (PUSCH) transmission on another carrier, the load on the control channel will increase and there is a problem that the capacity of the control channel is insufficient leading to increased blocking of scheduled transmissions. This further leads to difficulties to increase the system throughput and may even reduce the throughput. Moreover, new mobile data applications such as social networking and over internet telephony such as Facebook, Skype and Instant messaging clients, will increase the small packet transmission with non-periodic characteristics in time. Smaller packets imply that more users must be scheduled in a subframe and each scheduling requires one use of the PDCCH. This will also increase the load on the PDCCH, which is a problem.

SUMMARY

An object of embodiments herein is to provide a mechanism for enabling communication that enhances the performance of a radio communications network.

According to an aspect of embodiments herein the object is achieved by a method in a user equipment for communicating with a radio network node in the radio communications network. The user equipment is served by the radio network node. The user equipment receives a first information from the radio network node over a control channel. The first information comprises a pointer to which scheduling assignment element for the user equipment to use. The scheduling assignment element is comprised in a set of scheduling assignments stored at the user equipment. The user equipment then communicates data with the radio network node using a second information in the scheduling assignment element indicated by the pointer.

According to another aspect of embodiments herein the object is achieved by a method in a radio network node for transmitting a first information to the user equipment in the radio communications network. The radio network node serves the user equipment in the radio communications network. The radio network node transmits first information to the user equipment over the control channel. The first information comprises the pointer to which scheduling assignment element for the user equipment to use. The scheduling assignment element is comprised in a set of scheduling assignments stored at the user equipment. The scheduling assignment element comprises a second information to be used by the user equipment when communicating with the radio network node.

According to still another aspect of embodiments herein the object is achieved by a user equipment for communicating with the radio network node in the radio communications network. The user equipment comprises a receiver configured to receive a first information from the radio network node over a control channel. The first information comprises a pointer to which scheduling assignment element for the user equipment to use. The scheduling assignment element is comprised in a set of scheduling assignments stored at the user equipment. The user equipment further comprises a communicating circuit configured to communicate data with the radio network node by using second information in the scheduling assignment element indicated by the pointer.

According to yet another aspect of embodiments herein the object is achieved by a radio network node for transmitting first information to the user equipment in the radio communications network. The radio network node is configured to serve the user equipment in the radio communications network. The radio network node comprises a transmitter configured to transmit the first information to the user equipment over the control channel. The first information comprises the pointer to which scheduling assignment element for the user equipment to use. The scheduling assignment element is comprised in the set of scheduling assignments stored at the user equipment. The scheduling assignment element comprises second information to be used by the user equipment when communicating with the radio network node.

Thus, the resources carrying first information, such as control information, to indicate or point what resources to use for communicating, such as radio resources, Modulation and Coding Scheme, MCS, or similar, are reduced and the performance is enhanced.

BRIEF DESCRIPTION OF THE DRAWINGS

Embodiments will now be described in more detail in relation to the enclosed drawings, in which:

FIG. 4 is a schematic overview depicting control channel elements,

FIG. 5 is a schematic overview depicting control channel elements,

FIG. 13 is a block diagram depicting embodiments of a radio network node.

DETAILED DESCRIPTION

Figure 1:
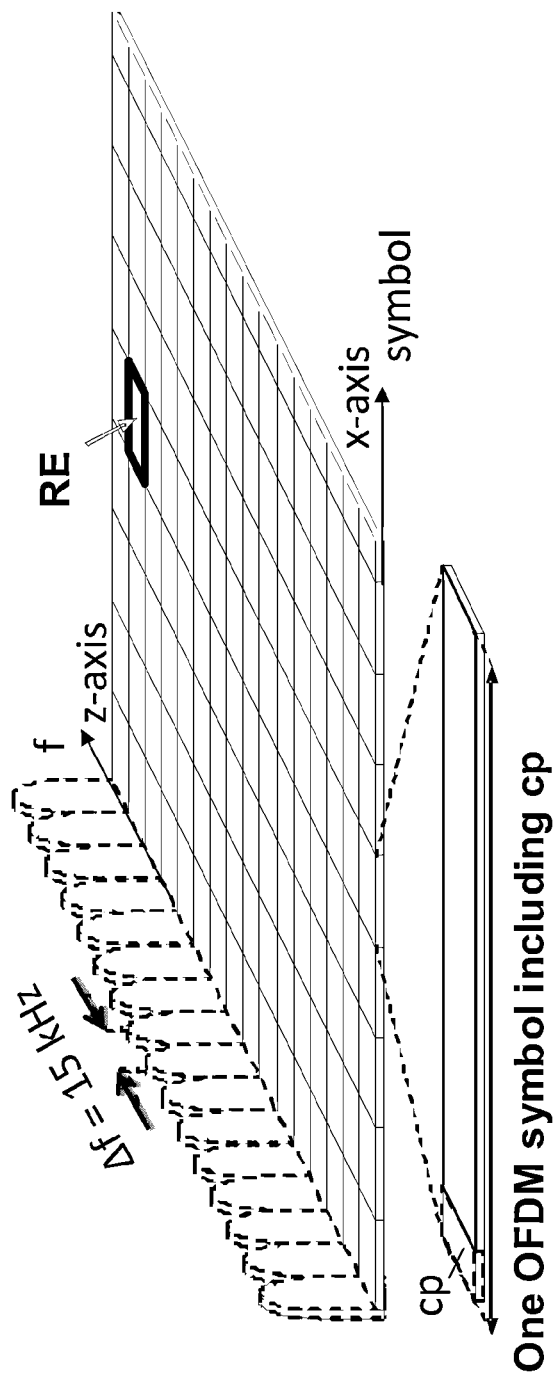
FIG. 1 is a schematic block diagram of a LTE downlink physical resource.
Figure 2:
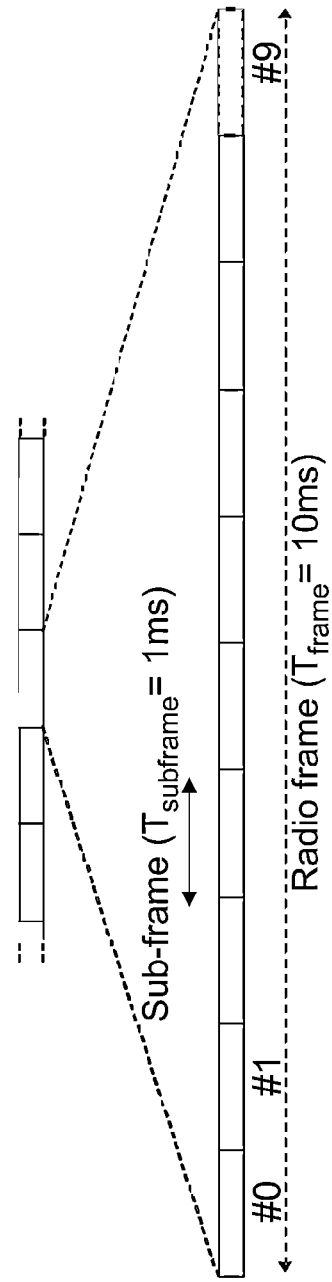
FIG. 2 is a schematic overview depicting radio frames.
Figure 3:
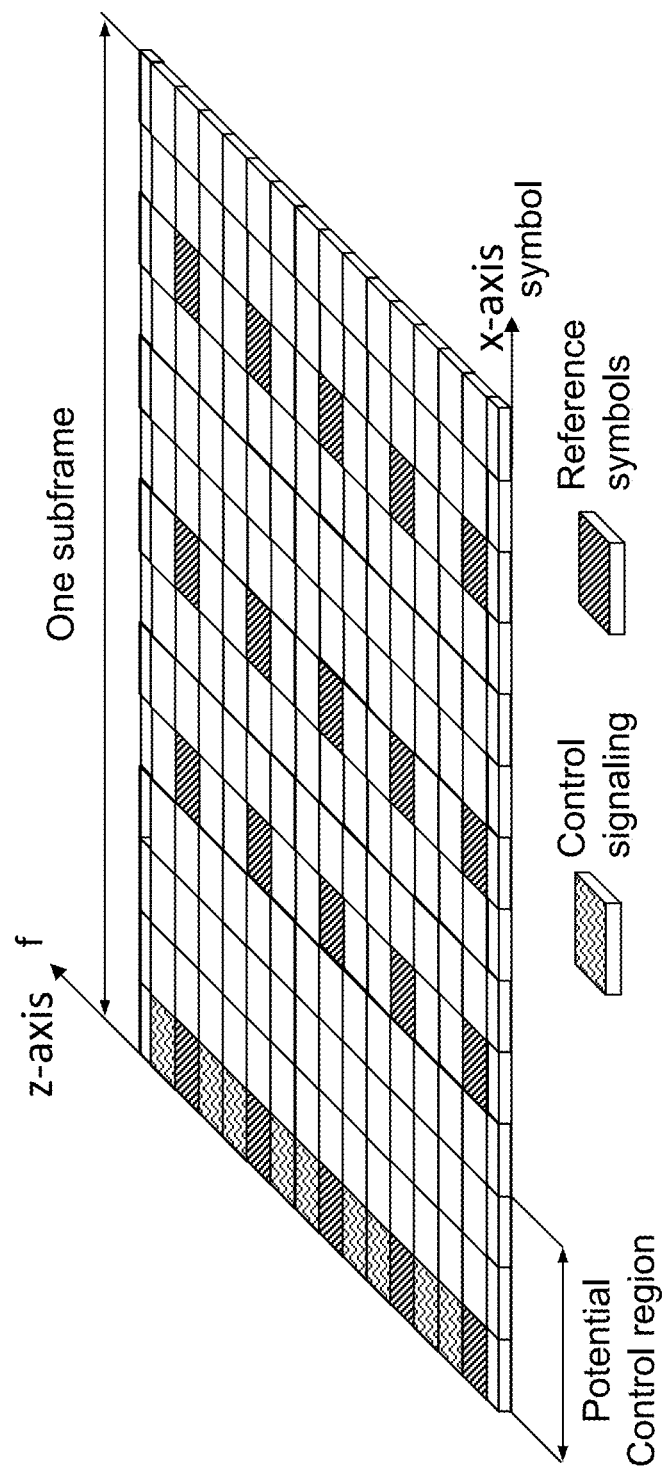
FIG. 3 is a schematic overview depicting a DL subframe.
Figure 6:
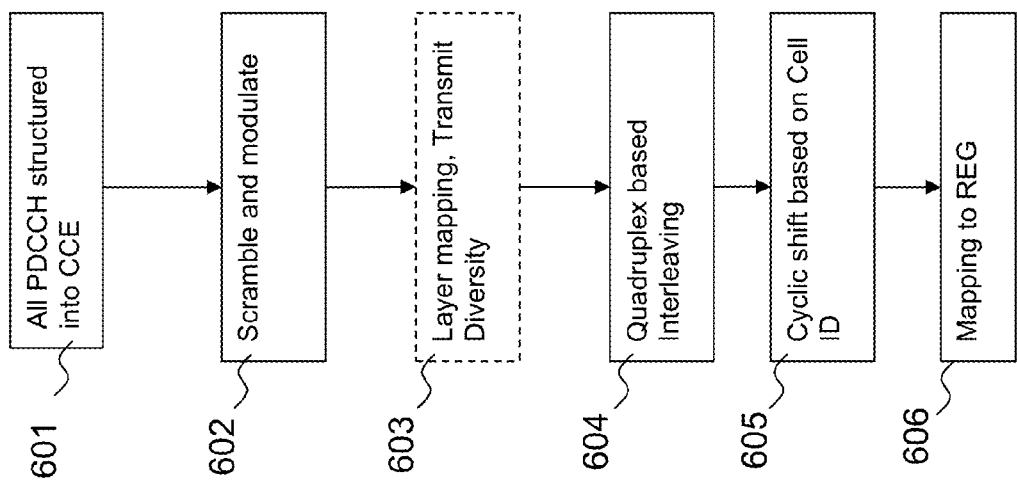
FIG. 6 is a flow chart depicting a method for mapping control channel elements to resource elements.
Figure 7:
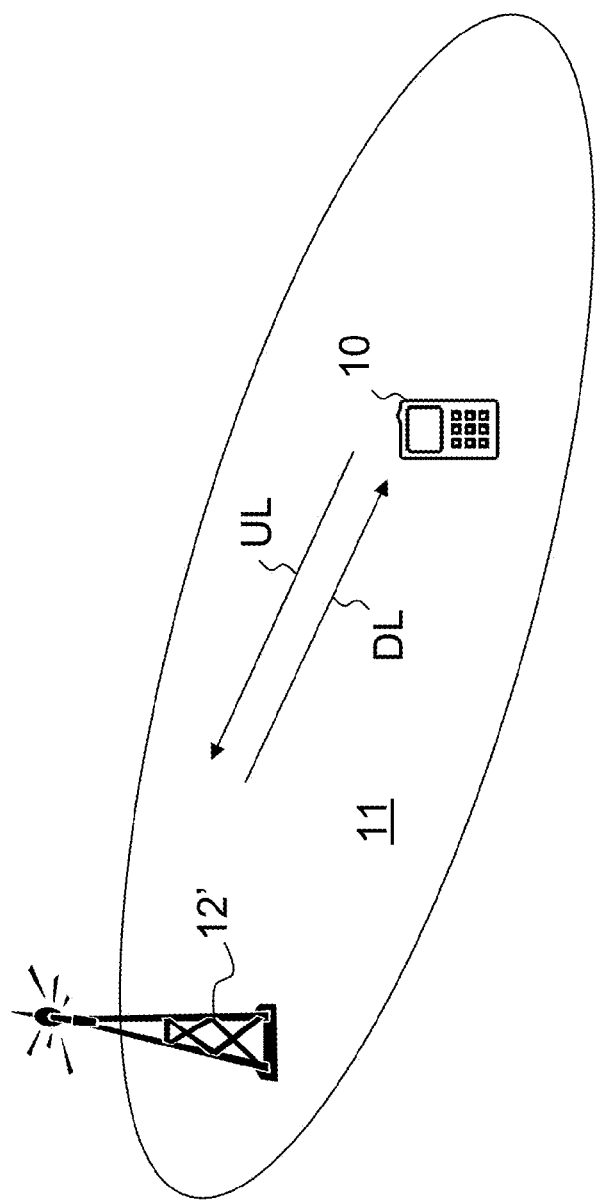
FIG. 7 is a schematic overview depicting a radio communications network according to embodiments herein.

FIG. 7 is a schematic overview depicting a radio communications network, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB).

The radio communications network comprises a radio network node 12, illustrated as a radio base station 12' in FIG. 7, providing radio coverage over at least one geographical area forming a cell 11. The cell definition may also incorporate frequency bands used for transmissions, which means that two different cells may cover the same geographical area but using different frequency bands. The radio base station 12', which is an example of the radio network node 12, may also be referred to as e.g. a NodeB, an evolved Node B (eNB, eNode B), a base transceiver station, Access Point Base Station, base station router, or any other network unit capable to communicate with a user equipment within the cell 11 depending e.g. of the radio access technology and terminology used. Also, the radio base station 12' may further serve one or more cells. The radio network node 12 may further be exemplified as a relay node or a beacon node.

A user equipment 10 is served in the cell 11 by the radio base station 12' and is communicating with the radio base station 12'. The user equipment 10 transmits data over an air or radio interface to the radio base station 12' in uplink (UL) transmissions and the radio base station 12' transmits data over an air or radio interface to the user equipment 10 in downlink (DL) transmissions. It should be understood that the term "user equipment" is a non-limiting term which means any wireless terminal, device or node e.g. Personal Digital Assistant (PDA), laptop, mobile, sensor, relay, mobile tablets, an Location Services (LCS) target device in general, an LCS client in the network or even a small base station.

The user equipment 10 is scheduled for communication by the radio base station 12', i.e. the radio base station 12' schedules radio resources for the user equipment 10 to use when communicating in the radio communications network. According to embodiments herein the radio base station 12' may configure or set up a set of scheduling assignments in the radio base station 12' and the user equipment 10. The set of scheduling assignments comprises scheduling assignment elements such as radio frequencies and/or positions. The radio base station 12' then schedules the user equipment 10 to use radio resources according to a scheduling assignment element and transmits a first information to the user equipment 10. The first information comprises a pointer to the scheduling assignment element in the set of scheduling assignments stored at the user equipment 10. The user equipment 10 receives the first information and retrieves a scheduling assignment information, referred to as a second information, in the scheduling assignment element pointed out by the pointer. The user equipment then uses at least the second information to communicate with the radio base station 12'.

Hence, an efficient signaling of scheduling assignment information is provided that enhances the performance of the radio communications network.

Figure 8:
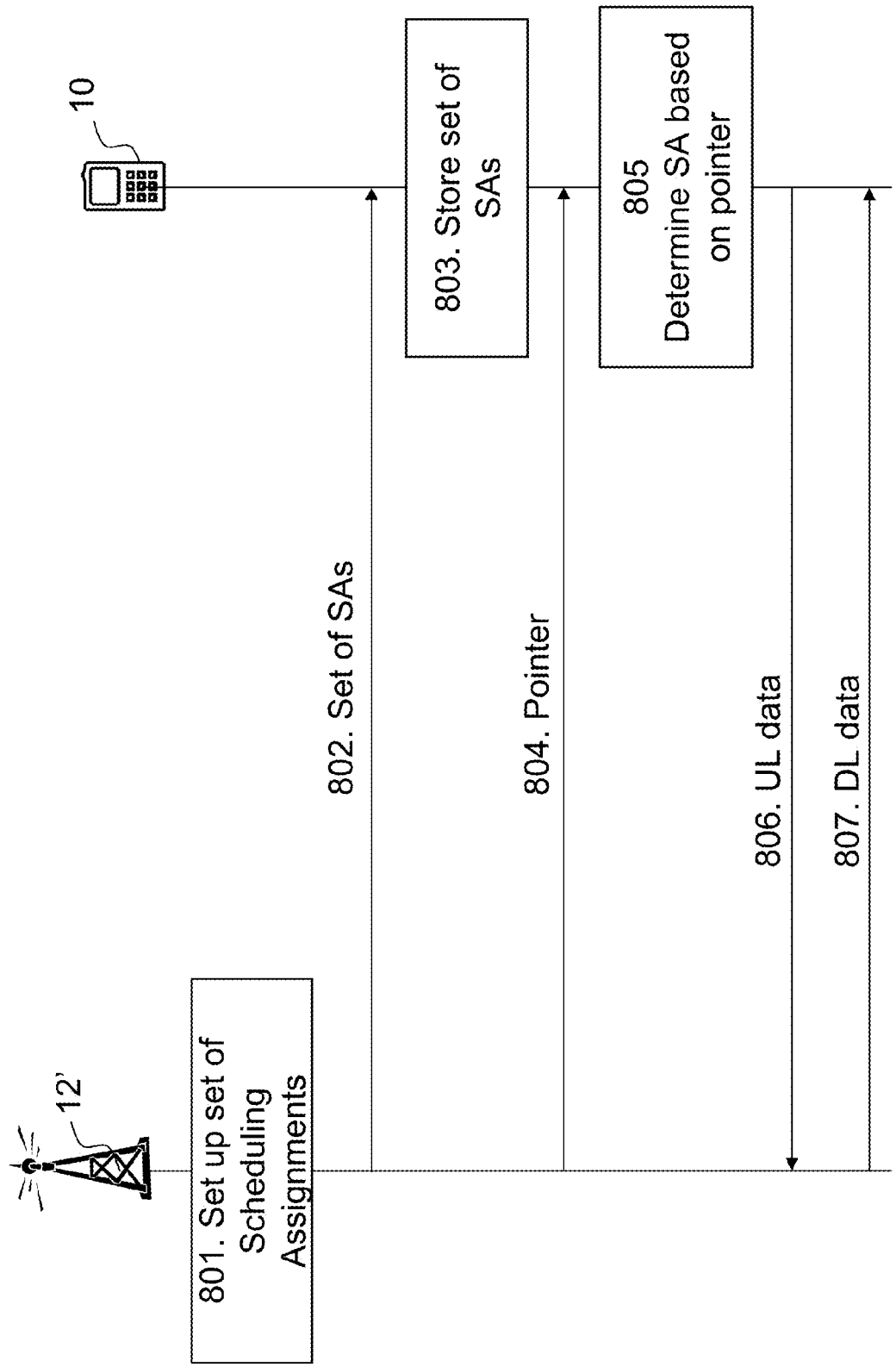
FIG. 8 is a schematic combined flowchart and signalling scheme depicting embodiments in the radio communications network.

FIG. 8 is a schematic combined flowchart and signaling scheme depicting embodiments of a method in the radio communications network. The actions may be performed in any suitable order. The radio network node 12 is exemplified as the radio base station 12' also in this example.

Action 801. The radio base station 12' may set up or configure a set of scheduling control information semi-statically. This may also be referred to as configuring a set of Scheduling Assignments (SA). The set of scheduling assignments, also referred to as set of preconfigured scheduling control information, comprises scheduling assignment elements. As stated above, each scheduling assignment element comprises a second information such as resource allocations of different bandwidths and/or resource allocations of different positions in frequency. The set of scheduling assignments is stored at the radio base station 12', e.g. as an indexed list, where each index corresponds to a scheduling assignment element.

Action 802. The set of SA may be transmitted to the user equipment 10, for instance using radio resource control signaling (RRC) or similar, during configuration of the user equipment 10. The set of scheduling assignments may be signaled as the indexed list.

Action 803. The user equipment 10 may store the set of SA. For example, the user equipment 10 stores the indexed list in a memory at the user equipment 10. It should further be understood that the user equipment 10 may additionally or alternatively be pre-configured with the set of scheduling assignments. E.g. the set of scheduling assignments may be pre-configured from a core network node, at manufacturing or similar.

Action 804. The radio base station 12' then transmits the first information e.g. a DCI. The DCI transmitted in Packet Data Control Channel (PDCCH) comprises a pointer, also referred to as a trigger, to which scheduling assignment element in the set of scheduling assignments the user equipment 10 shall use. E.g. the radio base station 12' transmits an index of one or two bits in the DCI pointing to a certain scheduling assignment element in the indexed list. The scheduling assignment element may comprise UL resources, DL resources, transmit power, Modulation and coding scheme etc, enabling the user equipment 10 to receive or transmit data to/from the radio base station 12', i.e. to communicate with the radio base station 12'.

Note that the DCI in the PDCCH may comprise other information that may not be semi-statically configured such as a Hybrid Automatic Repeat Request (HARQ) process number or similar.

Step 805. The user equipment 10 receives and decodes the first information such as the control information sent over the PDCCH. The user equipment 10 then determines which Scheduling assignment element to use based on the received pointer. To detect such a compact DCI format as described below, also referred to as super compact DCI format, the user equipment 10 may have to perform blind decodings of the PDCCH. This may lead to an increase in the number of blind decodings the user equipment 10 need to perform, which is undesirable from a complexity perspective.

In some embodiments, the first information, has its Cyclic Redundancy Check (CRC) scrambled with a special Radio Network Temporary Identifier (RNTI). The scrambled CRC/RNTI indicates to the user equipment 10 that this DCI message comprises the pointer. The first information may be transmitted as information in a compact DCI format. The first information comprises the pointer, also referred to as a triggering information, such as the index or similar, to a pre-configured set of scheduling assignments or information. The payload size of the compact DCI format, thus the first information, is the same as for DCI format 0/1A and may thereby be transmitted in the common search space but with CRC scrambled with a special RNTI.

In some embodiments the first information is transmitted in a UE specific search space, see e.g. FIG. 5 wherein a UE specific search space is indicated with diagonal stripes, wherein some of the blind decodings of the existing DCI formats has been reduced and is instead used, or "borrowed", for detecting the first information. Thereby the total number of blind decodings may be kept unchanged. This also allows the user equipment 10 to detect a normal size DCI format, for instance DCI format 2C and DCI format 4 for spatial multiplexing MIMO scheduling together with a compact DCI format for small packets. This is useful since the user equipment 10 may have a diverse set of data applications running in parallel on the user equipment 10, some of them needs large throughput of data and others only transmit small keep-alive messages. One example is file downloading in parallel with instant messaging clients, which is a common use case. Thus, some embodiments herein allow for detecting both normal and compact DCI format in the same subframe and are thus useful to reduce the PDCCH congestion.

In some embodiments the number of blind decodings for normal DCI formats is kept at a current level and new blind decodings are added for the first information. E.g. new search space for compact DCI format may be added. This has the same benefits as the above when it comes to handling diverse data applications, but with the drawback of increased UE complexity.

In some embodiments which may be combined with any of the embodiments above, the radio base station 12' and the user equipment 10 use a compact DCI format, that is the first information, for scheduling a transmission of control information in the uplink, e.g. for using PUSCH. For example, when carrier aggregation is used, periodic feedback reports of Channel State Information (CSI) may be configured for each carrier independently. If the user equipment 10 detects that CSI feedback instant collides among two or more carriers, a compact DCI format may be used to schedule a PUSCH resource to feed back the multiple CSI information for said multiple carriers instead of dropping all of the multiple CSI except one, which is the method currently used in the Rel.10 standard. Hence these embodiments provide a resolution to such collision problem between periodic CSI reports with a small PDCCH overhead.

Thus, the radio base station 12' may transmit a pointer in the first information to the user equipment 10 indicating which resources and possibly also which carrier to use. The user equipment 10 may then use these resources to transmit CSI for multiple carriers.

Action 806. The user equipment 10 may then use the second information, e.g. resource allocation, of the scheduling assignment element indicated in the received pointer to transmit UL data.

Action 807. The user equipment 10 may, alternatively or additionally, then use the second information, e.g. resource allocation, of the scheduling assignment element, which scheduling assignment element is indicated in the received pointer to receive DL data.

Thus, some embodiments herein disclose a method in the user equipment 10 receiving configuration data, which configuration data comprises a set of scheduling assignments. The network, e.g. the radio base station 12', may pre-configure the user equipment 10 with a set of scheduling assignments. The user equipment 10 may be scheduled by the first information, e.g. a triggering/pointer command, sent to the user equipment 10 using the PDCCH which comprises at least a pointer to which scheduling assignment element in the set of the scheduling assignments for the user equipment 10 to use. The user equipment 10 then transmits or receives data according to e.g. further information in the first information and also the second information in the triggered scheduling assignment element indicated by the pointer.

Figure 9:
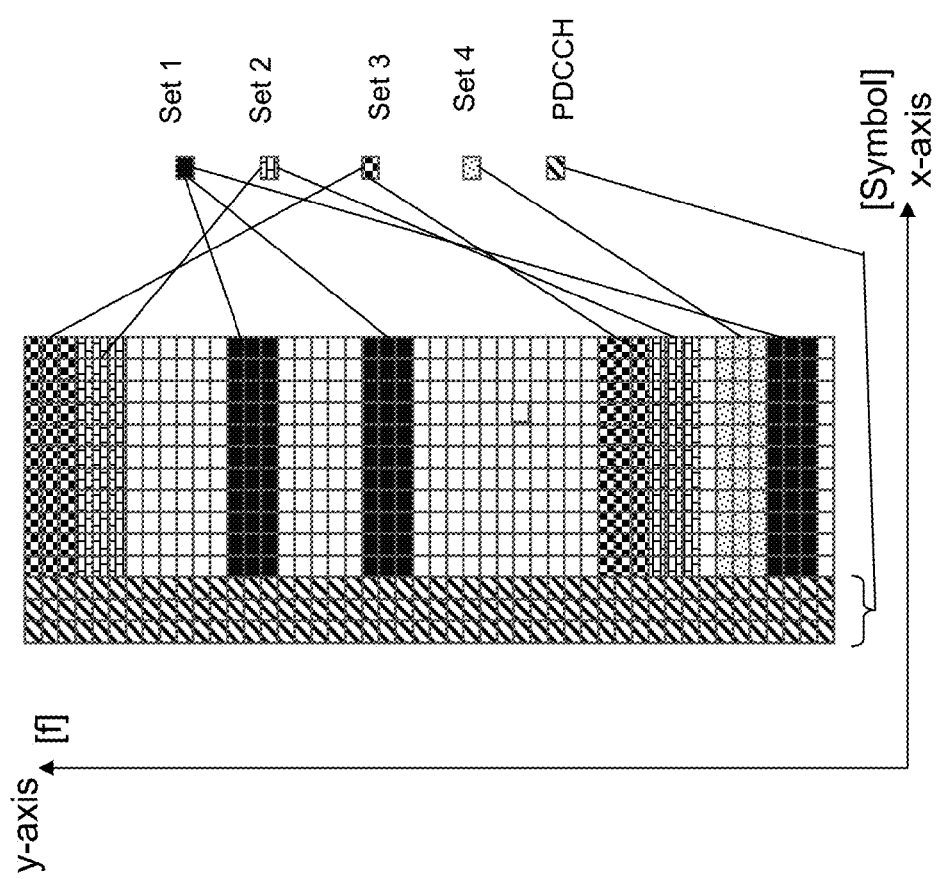
FIG. 9 is a schematic example of resource allocation according to embodiments herein.

FIG. 9 is a block diagram disclosing an example of a set of scheduling assignments. FIG. 9 shows four pre-configured scheduling assignments elements or sets of resource allocations, where each pattern represents one scheduling assignments element in the set. The example is described for the downlink resources but note that these embodiments equally well may be applied to an uplink resource. Thus, the set of scheduling assignments comprises four scheduling assignment elements and PDCCH, wherein the PDCCH is marked with diagonal stripes. A first set of resource elements, set 1, is marked as black Resource Elements (RE). A second set of resource elements, set 2, is marked with a brick pattern. A third set of resource elements, set 3, is marked with a checkered pattern. A fourth set of resource elements is marked with dotted pattern. Symbols are defined along an x-axis and frequencies [f] are defined along a y-axis. Since there are four pre-configured sets of resource elements in this example, only 2 bits are needed to allocate the resources which may be compared to the 25 bits in DCI format 2C. Hence, there is a reduction of the DCI format payload up to 50%, see below, compared to format 2C. The DCI format sent in the PDCCH may comprise at least the 2 bits for resource allocation plus other information such as, but not limited to, a transmit power control command for PUCCH, HARQ process number, Antenna port assignment, modulation and coding scheme for one transport block and the associated new data indicator and redundancy version.

Note that some of the other information may be a part of the pre-configured scheduling sets and triggered in the DCI format. As an example, a fixed modulation and coding scheme may be used to reduce the payload of the DCI format further. Alternatively, if somewhat more flexibility is needed, a set of pre-configured coding and modulation schemes may be used and a few bits indicating which set of pre-configured coding and modulation schemes are then used in the DCI format transmitted over PDCCH. This follows the same principle as for the resource allocation, namely some scheduling information is pre-configured and a pointer to which scheduling information element in the set of pre-configured information is sent over the PDCCH.

To illustrate the application of these embodiments, consider an already compact PDCCH format 1C. The total payload size is 44 bits and the bits are allocated to different fields as in Table 1.

TABLE 1

Format 1C PDCCH bit allocation

| Field | No of Bits |
|---|---|
| Format flag | 1 |
| Localized/Distributed indicator | 1 |
| RB assignment | 13 |
| MCS | 5 |
| Hybrid ARQ process number | 3 |
| New data indicator | 1 |
| Redundancy version | 2 |
| TPC | 2 |
| RNTI/CRC | 16 |

In table 1 format flag indicates a format of the DCI and Localized/Distributed indicator indicates whether the resource elements are distributed over separated sets of frequency resources or not. RB assignment field indicates Resource Blocks (RB) assigned as well as possible frequency hopping, and MCS is used to determine the modulation order and transport block size(s). HARQ process number indicates what resources to use for HARQ, and Redundancy version indicates what redundancy process to use. Transmission Power Control (TPC) indicates what TPC command to use, and Radio Network Temporary Identifier (RNTI) is encoded with the Cyclic Redundancy Check (CRC) value.

According to some embodiments, the 14 bits for "Localized/Distributed indicator" and "RB assignment" may be removed from the compact PDCCH. The 5-bit MCS field allows full flexibility of modulation and coding rate adaptation as shown in Table 2 below.

Furthermore, the 19 bits for "Localized/Distributed indicator", "RB assignment" and "MCS" may be removed from the compact DCI. This results in the case of a fixed modulation and coding rate pre-configuration.

Additionally, the 14 bits for "localized/distributed indicator" and "RB assignment" may be removed and the "MCS" field is replaced by a "reduced MCS" field with fewer bits. The reduced MCS" field may e.g. have 3 bits, which allows fixed modulation pre-configuration but flexible adaptation of coding rates. For example, for applications with many small packages, the modulation order may be pre-configured to be QPSK. Additionally or alternatively, the reduced MCS" field may have 3 bits and allows selection if $I_{MCS}$ that are multiples of 4 in Table 2. $I_{MCS}$ defines an index in the MCS table. This provides limited flexibility in adaptation of both modulation order and coding rate. Furthermore, the reduced MCS" field may have 4 bits and allows selection $I_{MCS}$ in the upper half of Table 2. This provides limited adaptation of modulation order but full flexibility in coding rate adaptation. In many deployment scenarios, 64QAM may not be needed because SINR limitation.

In summary, the teaching of some embodiments herein is that a subset of the scheduling control information is semi-statically pre-configured based on the application and deployment needs. The pre-configured settings are thus avoided from being repeated in every scheduling PDCCH.

TABLE 2

Modulation and TBS index table for PDSCH in LTE

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

The DCI formats in current LTE Rel.10 specifications are versatile and provide the network with very flexible resource allocation possibilities, very detailed link adaptation, the possibility to transmit two codewords of encoded bit information with up to eight and four spatially multiplexed layers in downlink and uplink respectively. In some scheduling assignments, this flexibility is unnecessary, for instance if channel quality information per subband is unavailable, the possibility to select an arbitrarily subband for transmission is not needed. Furthermore, if the payload of the PDSCH or PUSCH transmission is small, it will fit into one or a few Physical Resource Blocks (PRB) with QPSK modulation, no spatial multiplexing and a low code rate. Hence, the need for link adaptation is small and there is no need to send very detailed modulation and coding scheme information, i.e. link adaptation could be off or with coarse granularity.

If some of the flexibility is removed from the DCI format, its payload will decrease and the utilization of the number of CCEs per PDCCH will then decrease. This implies that more user equipments may be scheduled in the same subframe. Ideally, user equipments that utilize a small bandwidth, e.g. 1-2 PRB, should also ideally utilize only a small portion of the control bandwidth.

Embodiments herein provide at least the following advantages

Reduced PDCCH congestion by a smaller DCI payload per PDCCH

The size of the PDCCH scales with the size of the PUSCH and PDSCH resource allocation.

Figure 10:
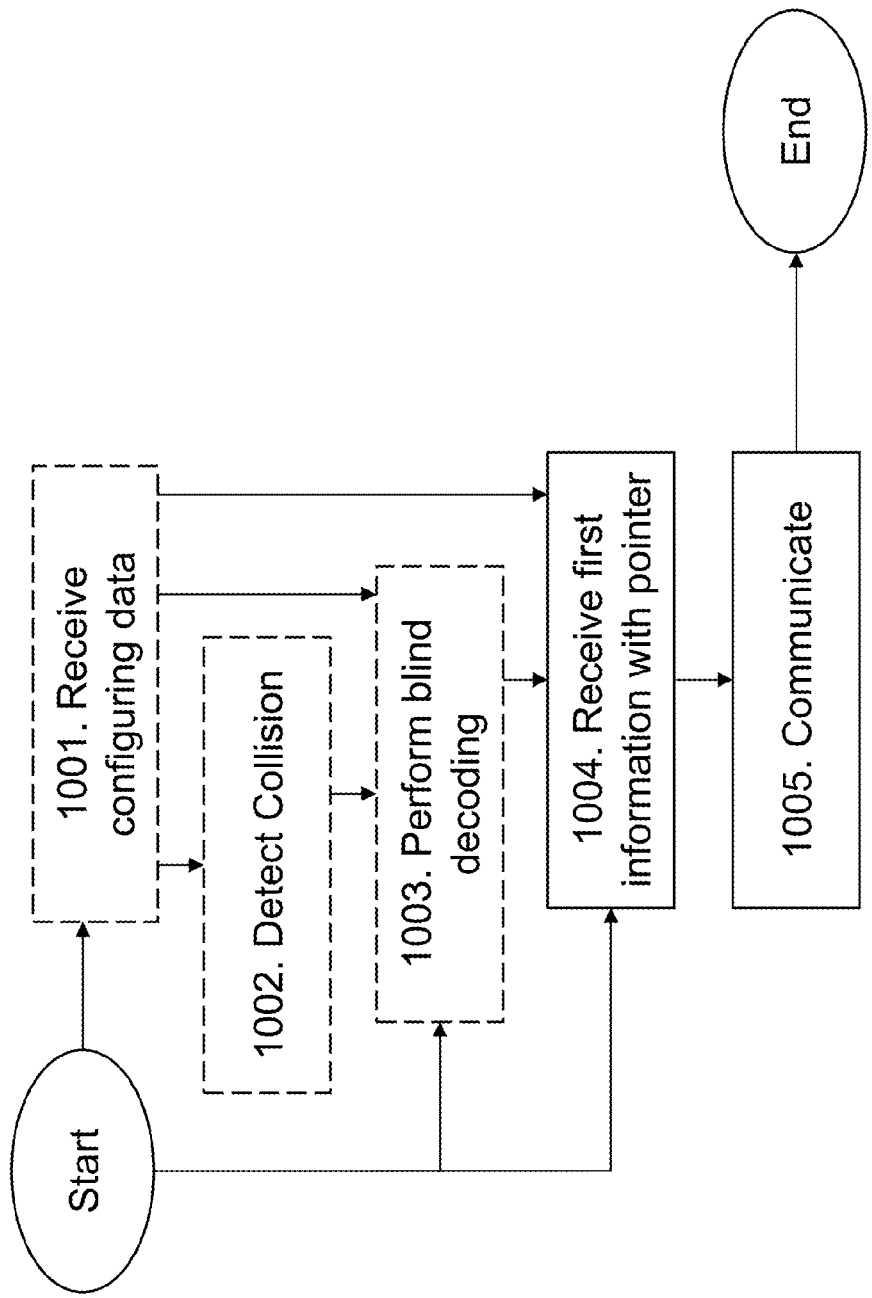
FIG. 10 is a schematic flowchart depicting a method in a user equipment.

The method actions in the user equipment 10 for communicating with the radio network node 12, exemplified above as the radio base station 12', in the radio communications network according to some general embodiments will now be described with reference to a flowchart depicted in FIG. 10. The actions do not have to be taken in the order stated below, but may be taken in any suitable order. Actions only performed in some embodiments are marked as dashed boxes. The user equipment 10 is served by the radio network node 12.

Action 1001. The user equipment 10 may receive configuration data from the radio network node 12. The configuration data comprises the set of scheduling assignments. The set of scheduling assignments may in some embodiments be pre-configured at the user equipment 10.

Action 1002. The user equipment 10 may use carrier aggregation reporting channel state information back to the radio network node 12 for the different carriers. The user equipment 10 may then detect a collision of channel state information transmissions of a number of carriers. In response to that the user equipment 10 performs the blind decodings for detecting the first information e.g. to use PUSCH for the feedback.

Action 1003. The user equipment 10 may perform blind decoding over control channel elements to detect the first information. In some embodiments the first information comprises a cyclic redundancy check sum scrambled with a special radio network temporary identifier and the blind decoding is performed over a common search space of control channel elements configured for user equipments served by the radio network node 12. The cyclic redundancy check sum being scrambled with the special radio network temporary identifier indicates that the first information comprises the pointer. Additionally or alternatively, the user equipment 10 performs the blind decoding is performed over a user equipment specific search space of control channel elements configured for the user equipment 10.

The user equipment 10 may perform the blind decoding a number of times over a subframe, and the number is independent whether the user equipment is enabled to detect the first information or not. That is, the number of blind decodings is kept at a same level and the compact DCI borrows blind decodings from legacy DCI formats.

Thus, the user equipment 10 may be configured to blind decode according to common search space or a user equipment specific search space.

The common search space carries the common control information and is monitored by all user equipments in the cell. The number of CCE aggregation levels supported by the common search space is limited to two i.e. 4 and 8 as compare to the UE-specific search space where four CCE aggregation levels are possible. This reduces the burden on UE for decoding common control information compared to decoding UE-specific control information. The common control space is used to carry important initial information including paging information, system information and random access procedures, and according to embodiments herein the information comprising the pointer. When searching the common control space the decoder always starts decoding from the first CCE. This restriction further simplifies the common search. The decoding is done on every possible PDCCH candidate set for given PDCCH format until it successfully decodes the PDCCH which be present in common search space.

The UE-specific search space carries control information specific to the particular user equipment 10 and is monitored by at least one user equipment in the cell. Unlike the common space search, the starting location of the UE-specific search space may be varied for each subframe or UE. The starting location of the UE-specific search space is determined in every subframe using hash function. In the UE-specific search space the user equipment 10 finds its PDCCH by monitoring a set of PDCCH candidates, a set of consecutive CCEs on which PDCCH could be mapped, in every subframe. If no CRC error is detected when the user equipment 10 uses its RNTI to de-masks the CRC on a PDCCH, the UE determines that PDCCH carries its own control information. The PDCCH candidate sets correspond to different PDCCH formats. There are 4 PDCCH formats i.e. 0, 1, 2 or 3. If the user equipment 10 fails to decode any PDCCH candidates for a given PDCCH format then it tries to decode candidates for other PDCCH format. This process is repeated for possible PDCCH formats until all directed PDCCHs are successfully decoded that may be present in UE-specific search space.

Action 1004. The user equipment 10 receives first information from the radio network node 12 over a control channel, e.g. the PDCCH. The first information comprises the pointer to which scheduling assignment element for the user equipment 10 to use. The scheduling assignment element is comprised in the set of scheduling assignments stored at the user equipment 10. The received first information may be comprised in a Downlink Control Information format. In some examples, the Downlink Control Information format comprises a field of reduced Modulation and Coding Scheme with first modulation and coding scheme information, e.g. three bits as stated above indicting different sections in Table 2. The second information may then comprise second modulation and coding scheme information, e.g. the Table 2.

Action 1005. The user equipment 10 communicates, i.e. transmits and/or receives, data with the radio network node 12 using second information in the scheduling assignment element indicated by the pointer. The second information may comprise as indicated above a resource allocation of a bandwidth and/or a resource allocation of a position in frequency.

Figure 11:
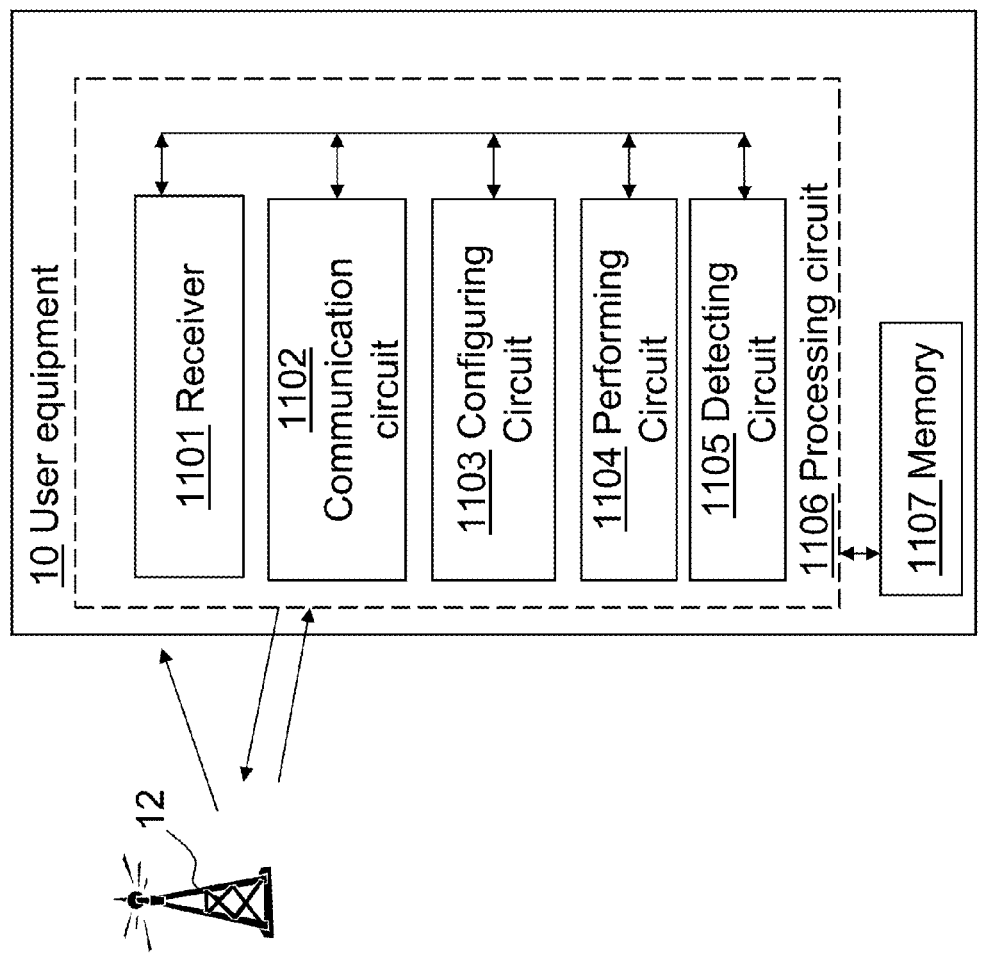
FIG. 11 is a block diagram depicting embodiments of a user equipment.

FIG. 11 is a block diagram depicting the user equipment 10. The user equipment 10 comprises a receiver 1101 configured to receive a first information from the radio network node 12 over the control channel. The first information comprises the pointer to which scheduling assignment element for the user equipment 10 to use. The scheduling assignment element is comprised in a set of scheduling assignments stored at the user equipment 10. Thus, the user equipment 10 comprises the receiver 1101 arranged to receive a command, a trigger, an index, a compact DCI format or similar indicating which element in the set to use. The receiver 1101 may further be configured to receive configuration data from the radio network node 12, which configuration data comprises the set of scheduling assignments.

The user equipment 10 further comprises a communicating circuit 1102 configured to communicate data with the radio network node 12 by using second information in the scheduling assignment element indicated by the pointer. The user equipment 10 thus comprises the communication circuit 1102 configured to use the indicated scheduling assignment.

The user equipment 10 comprises a configuring circuit 1103 arranged to configure the user equipment 10 with the set of scheduling assignments.

The set of scheduling assignments may be preconfigured at the user equipment 10, and the received first information may be comprised in a Downlink Control Information format. The Downlink Control Information format may comprise a field of reduced Modulation and Coding Scheme with first modulation and coding scheme information. The second information may then comprise second modulation and coding scheme information, e.g. parts of table 2. The second information may comprise a resource allocation of a bandwidth and/or a resource allocation of a position in frequency.

In some embodiments, the user equipment 10 comprises a performing circuit 1104 configured to perform blind decoding over control channel elements to detect the first information. The first information may comprise a cyclic redundancy check sum scrambled with a special radio network temporary identifier and the performing circuit 1104 may then be configured to perform the blind decoding over a common search space of control channel elements configured for user equipments served by the radio network node 12. The cyclic redundancy check sum scrambled with the special radio network temporary identifier then indicates that the first information comprises the pointer. The performing circuit 1104 may be configured to perform the blind decoding over a user equipment specific search space of control channel elements configured for the user equipment 10. In some embodiments the performing circuit 1104 is configured to perform the blind decoding a number of times over a subframe, which number is independent whether the user equipment 10 is enabled to detect the first information or not.

The user equipment 10 may further comprise a detecting circuit 1105 configured to detect a collision of channel state information transmissions of a number of carriers when using carrier aggregation. In response to that the performing circuit 1104 is configured to perform the blind decoding for detecting the first information.

The embodiments herein may be implemented through one or more processors, such as a processing circuit 1106 in the user equipment 10 depicted in FIG. 11, together with computer program code for performing the functions and/or method steps of the embodiments herein. The program code mentioned above may also be provided as a computer program product, for instance in the form of a data carrier carrying computer program code for performing embodiments herein when being loaded into the user equipment 10. One such carrier may be in the form of a CD ROM disc. It is however feasible with other data carriers such as a memory stick. The computer program code may furthermore be provided as pure program code on a server and downloaded to the user equipment 10. Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The user equipment 10 may further comprise a memory 1107 to be used to store the configuration information and similar. The memory 1107 may comprise one or more memory units and may be used to store for example data such as, configuration information, application to perform the methods herein when being executed on the user equipment 10 or similar.

Figure 12:
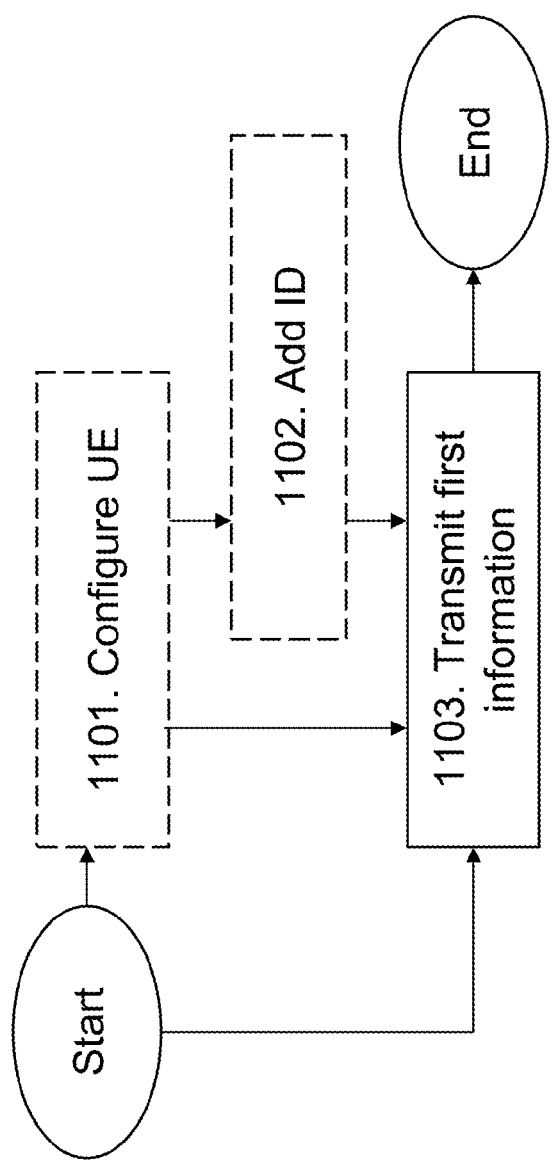
FIG. 12 is a schematic flowchart depicting a method in a radio network node.

The method actions in the radio network node 12, referred to as radio base station 12' in the figures, for transmitting first information to the user equipment 10 in the radio communications network, according to some general embodiments will now be described with reference to a flowchart depicted in FIG. 12. The actions do not have to be taken in the order stated below, but may be taken in any suitable order. Actions only performed in some embodiments are marked as dashed boxes. The user equipment 10 is served by the radio network node 12.

Action 1201. The radio network node 12 configures the user equipment 10 by transmitting the set of scheduling assignments to the user equipment 10. The set of scheduling assignments may be signaled as an indexed list, where each index corresponds to a scheduling assignment element. In some embodiments, the radio network node 12 configures the user equipment 10 to perform blind decoding over control channel elements to detect the first information. In some embodiments the radio network node 12 configures the user equipment 10 to perform blind decoding a number of times over a subframe. The number is independent whether the user equipment 10 is enabled to detect the first information or not. Thus, a blind decoding for the first information, e.g. being a compact DCI format, is performed instead for a different DCI format in the common search space or the user equipment specific search space.

Action 1202. The radio network node 12 may add a cyclic redundancy check sum scrambled with a special radio network temporary identifier to the first information identifying the first information. The first information is in some embodiments comprised in a common search space of control channel elements configured for user equipments served by the radio network node 12. Alternatively or additionally, the first information is comprised in a user equipment specific search space of control channel elements configured for the user equipment 10.

Action 1203. The radio network node 12 transmits first information to the user equipment 10 over the control channel, which first information comprises the pointer to which scheduling assignment element for the user equipment 10 to use. The scheduling assignment element is comprised in the set of scheduling assignments stored at the user equipment 10. As stated above, the scheduling assignment element comprises second information to be used by the user equipment 10 when communicating with the radio network node 12. The radio network node 12 may schedule the user equipment 10 for using the Packet Uplink Shared Channel.

FIG. 13 is a block diagram depicting the radio network node 12, e.g. the radio base station 12', for transmitting first information to the user equipment 10 in the radio communications network. The radio network node 12 is configured to serve the user equipment 10 in the radio communications network.

The radio network node 12 comprises a transmitter 1301 configured to transmit the first information to the user equipment 10 over the control channel. The first information comprises the pointer to which scheduling assignment element for the user equipment 10 to use. The scheduling assignment element is comprised in a set of scheduling assignments stored at the user equipment 10. The scheduling assignment element comprises the second information, e.g. some DCI information, to be used by the user equipment 10 when communicating with the radio network node 12. The transmitter 1301 may further be configured to transmit the set of scheduling assignments as the indexed list, where each index corresponds to a scheduling assignment element.

The radio network node 12 may further comprise a configuring circuit 1302 arranged to configure the user equipment 10 by transmitting the set of scheduling assignments to the user equipment 10. The configuring circuit 1302 may, alternatively or additionally, be arranged to configure the user equipment 10 to perform blind decoding over control channel elements to detect the first information. The set of scheduling assignments may be preconfigured at the user equipment 10 from a core network node or a manufacturer. The configuring circuit 1302 may be arranged to configure the user equipment 10 to perform blind decoding a number of times over a subframe, which number is independent whether the user equipment 10 is enabled to detect the first information or not.

In some embodiments the radio network node 12 is configured to schedule the user equipment 10 to use Packet Uplink Shared Channel.

The radio network node 12 may further comprise an adding circuit 1303 configured to add the cyclic redundancy check sum scrambled with the special radio network temporary identifier to the first information identifying the first information. Thus, the user equipment 10 will detect that e.g. the received first information is a compact DCI format.

The radio network node 12 may in some embodiments comprise the first information in a common search space of control channel elements configured for user equipments served by the radio network node 12. In some additional or alternative embodiments the radio network node 12 may comprise the first information in the user equipment specific search space of control channel elements configured for the user equipment 10.

Thus, the radio network node 12 may comprise the configuring circuit 1302 arranged to transmit a set of scheduling assignments. These set of scheduling assignments may also be pre-configured from a core network node, at manufacturing or similar. The radio network node 12 comprises the transmitter 1301, which is configured to transmit a command, trigger, or an index indicating a selected scheduling assignment to the user equipment 10. The scheduling assignment may be based on load, data, type of service or similar. Thus, the radio network node 12 knows, has an index table stored, the relation between the command and the scheduling assignment.

The embodiments herein may be implemented through one or more processors, such as a processing circuit 1304 in the radio network node 12 depicted in FIG. 13, together with computer program code for performing the functions and/or method steps of the embodiments herein. The program code mentioned above may also be provided as a computer program product, for instance in the form of a data carrier carrying computer program code for performing embodiments herein when being loaded into the radio network node 12. One such carrier may be in the form of a CD ROM disc. It is however feasible with other data carriers such as a memory stick. The computer program code may furthermore be provided as pure program code on a server and downloaded to the radio network node 12. Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The radio network node 12 may further comprise a memory 1305 to be used to store the configuration information and similar. The memory 1305 may comprise one or more memory units and may be used to store for example data such as, configuration information, application to perform the methods herein when being executed on the radio network node 12 or similar.

Modifications and other embodiments of the disclosed embodiment(s) will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a user equipment for communicating with a radio network node in a radio communications network, which user equipment is served by the radio network node, wherein the method comprises: receiving first information from the radio network node over a control channel, which first information comprises a pointer to which scheduling assignment element for the user equipment to use, which scheduling assignment element is comprised in a set of scheduling assignments stored at the user equipment, the first information received in a compact DCI format comprising a common DCI format that has been reduced to use a portion of bits in the common DCI format for the pointer to the scheduling assignment element, the compact DCI format comprising a field of reduced Modulation and Coding Scheme with first modulation and coding scheme information; communicating data with the radio network node using second information in the scheduling assignment element indicated by the pointer, the second information comprising second modulation and coding scheme information; and performing blind decoding over control channel elements to detect the first information, wherein the first information comprises a cyclic redundancy check sum scrambled with a special radio network temporary identifier and the performing is performed over a common search space control channel elements configured for user equipments served by the radio network node, and wherein the cyclic redundancy check sum scrambled with the special radio network temporary identifier indicates that the first information comprises the pointer, and wherein one or more blind decodings have been reduced within the compact DCI format to accommodate the pointer to the scheduling assignment element such that a total number of the one or more blind decodings remains the same as the common DCI format.

2. the method according to claim 1, further comprising receiving configuration data from the radio network node, which configuration data comprises the set of scheduling assignments.

3. the method according to claim 1, wherein the set of scheduling assignments is preconfigured at the user equipment.

4. the method according to claim 1, wherein the second information comprises a resource allocation of a bandwidth and/or a resource allocation of a position in frequency.

5. The method according to claim 1, wherein the performing is performed over a user equipment specific search space of control channel elements configured for the user equipment.

6. The method according to claim 1, wherein the performing is performed a number of times over a subframe, which number is independent whether the user equipment is enabled to detect the first information or not.

7. The method according to claim 1, further comprising detecting a collision of channel state information transmissions of a number of carriers when using carrier aggregation, and in response to that performing the blind decoding for detecting the first information.

8. A method in a radio network node for transmitting first information to a user equipment in a radio communications network, which radio network node serves the user equipment in the radio communications network, wherein the method comprises transmitting first information to the user equipment over a control channel, which first information comprises a pointer to which scheduling assignment element for the user equipment to use, which scheduling assignment element is comprised in a set of scheduling assignments stored at the user equipment, the first information transmitted in a compact DCI format comprising a common DCI format that has been reduced to use a portion of bits in the common DCI format for the pointer to the scheduling assignment element, the compact DCI format comprising a field of reduced Modulation and Coding Scheme with first modulation and coding scheme information, and the scheduling assignment element comprises second information to be used by the user equipment when communicating with the radio network node, the second information comprising second modulation and coding scheme information, and wherein one or more blind decodings have been reduced within the compact DCI format to accommodate the pointer to the scheduling assignment element such that a total number of blind decodings remains the same as the common DCI format, the first information detectable by the user equipment when blind decoding is performed over a common search space of control channel elements configured for user equipment served by the radio network node, the first information comprising a cyclic redundancy check sum scrambled with a special radio network temporary identifier to indicate that the first information comprises the pointer.

9. the method according to claim 8, further comprising configuring the user equipment by transmitting the set of scheduling assignments to the user equipment.

10. the method according to claim 9, wherein the set of scheduling assignments is signaled as an indexed list, where each index corresponds to a scheduling assignment element.

11. the method according to claim 8, wherein the transmitting is performed for scheduling the user equipment using Packet Uplink Shared Channel.

12. The method according to claim 8, wherein the first information is comprised in a user equipment specific search space of control channel elements configured for the user equipment.

13. The method according to claim 8, wherein the configuring comprises to configure the user equipment to perform blind decoding a number of times over a subframe, which number is independent whether the user equipment is enabled to detect the first information or not.

14. A user equipment for communicating with a radio network node in a radio communications network, wherein the user equipment comprises: a receiver configured to receive a first information from the radio network node over a control channel, which first information comprises a pointer to which scheduling assignment element for the user equipment to use, which scheduling assignment element is comprised in a set of scheduling assignments stored at the user equipment, the first information received in a compact DCI format comprising a common DCI format that has been reduced to use a portion of bits in the common DCI format for the pointer to the scheduling assignment element, the compact DCI format comprising a field of reduced Modulation and Coding Scheme with first modulation and coding scheme information; and a communicating circuit configured to communicate data with the radio network node by using second information in the scheduling assignment element indicated by the pointer, the second information comprising second modulation and coding scheme information; and a performing circuit configured to perform blind decoding over control channel elements to detect the first information, the first information comprising a cyclic redundancy check sum scrambled with a special radio network temporary identifier, and wherien the performing circuit is configured to perform the blind decoding over a common search space of control channel elements configured for user equipments served by the radio network node, and wherein the cyclic redundancy check sum scrambled with the special radio network temporary identifier indicates that the first information comprises the pointer, and wherein one or more blind decodings have been reduced within the compact DCI format to accommodate the pointer to the scheduling assignment element such that a total number of blind decodings remains the same as the common DCI format.

15. The user equipment according to claim 14, wherein the receiver is further configured to receive configuration data from the radio network node, which configuration data comprises the set of scheduling assignments.

16. the user equipment according to claim 14, wherein the set of scheduling assignments is preconfigured at the user equipment.

17. the user equipment according to claim 14, wherein the second information comprises a resource allocation of a bandwidth and/or a resource allocation of a position in frequency.

18. The user equipment according to claim 14, wherein the performing circuit is configured to perform the blind decoding over a user equipment specific search space of control channel elements configured for the user equipment.

19. The user equipment according to claim 14, wherein the performing circuit is configured to perform the blind decoding a number of times over a subframe, which number is independent whether the user equipment is enabled to detect the first information or not.

20. The user equipment according to claim 14, further comprising a detecting circuit configured to detect a collision of channel state information transmissions of a number of carriers when using carrier aggregation, and in response to that the performing circuit is configured to perform the blind decoding for detecting the first information.

21. A radio network node for transmitting first information to a user equipment in a radio communications network, which radio network node is configured to serve the user equipment in the radio communications network, wherein the radio network node comprises a transmitter configured to transmit first information to the user equipment over a control channel, which first information comprises a pointer to which scheduling assignment element for the user equipment to use, which scheduling assignment element is comprised in a set of scheduling assignments stored at the user equipment, the first information transmitted in a compact DCI format comprising a common DCI format that has been reduced to use a portion of bits in the common DCI format for the pointer to the scheduling assignment element, the compact DCI format comprising a field of reduced Modulation and Coding Scheme with first modulation and coding scheme information, and the scheduling assignment element comprises second information to be used by the user equipment when communicating with the radio network node, the second information comprising second modulation and coding scheme information, and wherein one or more blind decodings have been reduced within the compact DCI format to accommodate the pointer to the scheduling assignment element such that a total number of blind decodings remains the same as the common DCI format, the first information detectable by the user equipment when blind decoding is performed over a common search space of control channel elements configured for user equipment served by the radio network node, the first information comprising a cyclic redundancy check sum scrambled with a special radio network temporary identifier to indicate that the first information comprises the pointer.

22. The radio network node according to claim 21, further comprising a configuring circuit arranged to configure the user equipment by transmitting the set of scheduling assignments to the user equipment.

23. The radio network node according to claim 22, wherein the transmitter is configured to transmit the set of scheduling assignments as an indexed list, where each index corresponds to a scheduling assignment element.

24. the radio network node according to claim 21, wherein the radio network node is configured to schedule the user equipment to use Packet Uplink Shared Channel.

25. The radio network node according to claim 21, wherein the first information is comprised in a user equipment specific search space of control channel elements configured for the user equipment.

26. The radio network node according to claim 21, the first information detectable by the user equipment when blind decoding is performed over a common search space of control channel elements configured for user equipment served by the radio network node, the first information comprising a cyclic redundancy check sum scrambled with a special radio network temporary identifier to indicate that the first information comprises the pointer, wherein the configuring circuit is arranged to configure the user equipment to perform blind decoding a number of times over a subframe, which number is independent whether the user equipment is enabled to detect the first information or not.

* * * * *